United States Patent
Bouchard et al.

(10) Patent No.: US 6,842,186 B2
(45) Date of Patent: Jan. 11, 2005

(54) HIGH SPEED PHOTO-PRINTING APPARATUS

(75) Inventors: Alain Bouchard, Boston, MA (US); Brian D. Busch, Sudbury, MA (US); Daniel P. Bybell, Medford, MA (US); Anemarie DeYoung, Lexington, MA (US); Sandra B. Lawrence, Brookline, MA (US); Michael L. Reisch, Carlisle, MA (US); Suhail S. Saquib, Shrewsbury, MA (US); Dana F. Schuh, Windham, NH (US); Stephen J. Telfer, Arlington, MA (US); Jay E. Thornton, Watertown, MA (US); William T. Vetterling, Lexington, MA (US); Michael S. Viola, Burlington, MA (US)

(73) Assignee: Polaroid Corporation, Waltham, MA (US)

( * ) Notice: Subject to any disclaimer, the term of this patent is extended or adjusted under 35 U.S.C. 154(b) by 99 days.

(21) Appl. No.: 10/080,883

(22) Filed: Feb. 22, 2002

(65) Prior Publication Data

US 2002/0191066 A1 Dec. 19, 2002

Related U.S. Application Data

(63) Continuation-in-part of application No. 09/872,424, filed on May 30, 2001, now abandoned.

(51) Int. Cl.$^7$ .................................................. B41J 2/37
(52) U.S. Cl. ..................................................... 347/188
(58) Field of Search ........................ 347/183, 188–192, 347/185, 194–195, 172–173; 400/120.09, 120.1, 120.11, 120.12, 120.14, 120.15, 120.02, 120.07; 156/235

(56) References Cited

U.S. PATENT DOCUMENTS 3,820,133 A    6/1974   Adorney et al. .............. 354/60
3,864,708 A    2/1975   Allen ........................... 354/290
4,070,587 A    1/1978   Hanakata ..................... 307/141
4,072,973 A    2/1978   Mayo .......................... 354/295

(List continued on next page.)

FOREIGN PATENT DOCUMENTS

EP    0 204 094          12/1986   ............ H04N/1/40
EP    0 619 188 A2       10/1994   ............ B41J/2/355
EP    0 625 425 A2       11/1994   ............. B41J/2/36

(List continued on next page.)

OTHER PUBLICATIONS

"Digital Halftoning", Robert Ulichney, Cambridge, MA, the MIT Press (1987), ISBN, 0–262–21009–6, Chapters 5 and 6.
"NIP17: International Conference on Digital Printing Technologies", Marriott Harbor Beach Resort, Fort Lauderdale, Florida, Sep. 30–Oct. 5, 2001, *New Thermal Offset Printing Employing Dye*.
*Transfer Technology* (*Tandem TOP–D*), N. Taguchi, Y. Oochi, K. Nago, Y. Shimazaki and S. Yoshida, AVC Company, Matsushita Electric Industrial Co., Ltd. (Japan).

(List continued on next page.)

*Primary Examiner*—K. Feggins

(57) ABSTRACT

A thermal printer is disclosed which includes a plurality of thermal print heads, each of the plurality of thermal print heads being operable to print a distinct one of a plurality of colors. The plurality of thermal print heads may print output at a plurality of spatial resolutions. The thermal printer may include dot size varying means for varying perceived levels of color printed by the thermal printer by varying sizes of dots printed by the plurality of thermal print heads. The printer may perform various image processing steps on an image to be printed, such as tone scale adjustment, thermal history control, and common mode voltage correction, to improve the perceived quality of the printed image. The thermal printer may be incorporated into a digital photo-printing vending machine for printing images provided by a customer.

16 Claims, 7 Drawing Sheets

U.S. PATENT DOCUMENTS

| | | | | |
|---|---|---|---|---|
| 4,089,017 | A | 5/1978 | Buldini | 354/81 |
| 4,284,876 | A | 8/1981 | Ishibashi et al. | 219/216 |
| 4,309,712 | A | 1/1982 | Iwakura | 346/76 PH |
| 4,347,518 | A | 8/1982 | Williams et al. | 347/211 |
| 4,364,063 | A | 12/1982 | Anno et al. | 347/195 |
| 4,385,302 | A | 5/1983 | Moriguchi et al. | 347/173 |
| 4,391,535 | A | 7/1983 | Palmer | 400/120.11 |
| 4,415,908 | A | 11/1983 | Sugiura | 347/190 |
| 4,443,121 | A | 4/1984 | Arai | 358/3.01 |
| 4,447,818 | A | 5/1984 | Kurata et al. | 347/173 |
| 4,464,669 | A | 8/1984 | Sekiya et al. | 347/195 |
| 4,514,738 | A | 4/1985 | Nagato et al. | 347/195 |
| 4,524,368 | A | 6/1985 | Inui et al. | 347/196 |
| 4,540,992 | A | 9/1985 | Moteki et al. | 347/173 |
| 4,563,691 | A | 1/1986 | Noguchi et al. | 347/190 |
| 4,607,262 | A | 8/1986 | Moriguchi et al. | 347/196 |
| 4,638,372 | A | 1/1987 | Leng et al. | 358/296 |
| 4,686,549 | A | 8/1987 | Williams et al. | 503/227 |
| 4,688,051 | A | 8/1987 | Kawakami et al. | 347/184 |
| 4,738,526 | A | 4/1988 | Larish | 354/412 |
| 4,739,344 | A | 4/1988 | Sullivan et al. | 346/76.1 |
| 4,777,496 | A * | 10/1988 | Maejima et al. | 347/172 |
| 4,805,033 | A | 2/1989 | Nishikawa | 358/298 |
| 4,809,063 | A | 2/1989 | Moriguchi et al. | 358/75 |
| 4,884,080 | A | 11/1989 | Hirahara et al. | 346/46 |
| 5,006,866 | A | 4/1991 | Someya | |
| 5,109,235 | A | 4/1992 | Sasaki | 346/76 PH |
| 5,132,709 | A | 7/1992 | West | 346/76 PH |
| 5,244,861 | A | 9/1993 | Campbell et al. | 503/227 |
| 5,285,220 | A | 2/1994 | Suzuki et al. | 346/120 |
| 5,323,245 | A | 6/1994 | Rylander | 358/536 |
| 5,422,662 | A | 6/1995 | Fukushima et al. | 342/211 |
| 5,469,203 | A | 11/1995 | Hauschild | 347/190 |
| 5,479,263 | A | 12/1995 | Jacobs et al. | 358/298 |
| 5,497,174 | A | 3/1996 | Stephany et al. | 347/13 |
| 5,521,626 | A | 5/1996 | Tanaka et al. | 347/183 |
| 5,539,443 | A | 7/1996 | Mushika et al. | 347/194 |
| 5,569,347 | A | 10/1996 | Obata et al. | 156/235 |
| 5,576,745 | A | 11/1996 | Matsubara | 347/14 |
| 5,602,653 | A | 2/1997 | Curry | 358/454 |
| 5,623,297 | A | 4/1997 | Austin et al. | 347/194 |
| 5,623,581 | A | 4/1997 | Attenberg | 358/1.6 |
| 5,625,399 | A | 4/1997 | Wiklof et al. | 347/195 |
| 5,642,148 | A | 6/1997 | Fukushima et al. | 347/211 |
| 5,644,351 | A | 7/1997 | Matsumoto et al. | 347/194 |
| 5,646,672 | A | 7/1997 | Fukushima | 347/211 |
| 5,664,253 | A | 9/1997 | Meyers | 396/603 |
| 5,694,484 | A | 12/1997 | Cottrell et al. | 382/167 |
| 5,706,044 | A | 1/1998 | Fukushima | 347/211 |
| 5,711,620 | A | 1/1998 | Sasaki et al. | 400/120.02 |
| 5,719,615 | A | 2/1998 | Hashiguchi et al. | 347/195 |
| 5,721,578 | A | 2/1998 | Nakai et al. | 347/183 |
| 5,729,274 | A * | 3/1998 | Sato | 347/173 |
| 5,777,599 | A | 7/1998 | Poduska, Jr. | 345/136 |
| 5,784,092 | A | 7/1998 | Fukuoka | 347/190 |
| 5,786,837 | A | 7/1998 | Kaerts et al. | 347/190 |
| 5,786,900 | A | 7/1998 | Sawano | 358/298 |
| 5,800,075 | A | 9/1998 | Katsuma et al. | 400/120.14 |
| 5,808,653 | A | 9/1998 | Matsumoto et al. | 347/194 |
| 5,809,164 | A | 9/1998 | Hultgren, III | 382/162 |
| 5,818,474 | A | 10/1998 | Takahashi et al. | 347/15 |
| 5,841,461 | A | 11/1998 | Katsuma | 347/195 |
| 5,889,546 | A | 3/1999 | Fukuoka | 347/188 |
| 5,897,254 | A | 4/1999 | Tanaka et al. | 400/120.07 |
| 5,913,019 | A | 6/1999 | Attenberg | 358/1.18 |
| 5,956,067 | A | 9/1999 | Isono et al. | 347/176 |
| 5,956,421 | A | 9/1999 | Tanaka et al. | 382/172 |
| 5,995,654 | A | 11/1999 | Buhr et al. | 382/162 |
| 5,999,204 | A | 12/1999 | Kojima | 347/194 |
| 6,005,596 | A | 12/1999 | Yoshida et al. | 347/176 |
| 6,069,982 | A | 5/2000 | Reuman | 382/275 |
| 6,104,421 | A | 8/2000 | Iga et al. | 347/173 |
| 6,104,502 | A | 8/2000 | Shiomi | 358/1.9 |
| 6,106,173 | A * | 8/2000 | Suzuki et al. | 400/120.02 |
| 6,108,105 | A | 8/2000 | Takeuchi et al. | 358/455 |
| 6,128,099 | A | 10/2000 | Delabastita | 358/1.9 |
| 6,128,415 | A | 10/2000 | Hultgren, III et al. | 382/276 |
| 6,186,683 | B1 | 2/2001 | Shibuki | 400/120.08 |
| 6,226,021 | B1 | 5/2001 | Kobayashi et al. | 347/183 |
| 6,293,651 | B1 | 9/2001 | Sawano | 347/40 |
| 6,425,699 | B1 | 7/2002 | Doval et al. | 400/582 |
| 6,537,410 | B2 * | 3/2003 | Arnost et al. | 156/235 |
| 2002/0071022 | A1 * | 6/2002 | Kojima | 347/183 |
| 2002/0105573 | A1 * | 8/2002 | Fujimoto et al. | 347/183 |

FOREIGN PATENT DOCUMENTS

| | | | |
|---|---|---|---|
| EP | 0 626 611 A1 | 11/1994 | G03B/17/53 |
| EP | 0 791 472 A2 | 8/1997 | B41J/19/78 |
| EP | 1 004 442 A2 | 5/2000 | B41J/2/05 |
| EP | 1 078 750 A2 | 2/2001 | B41J/2/05 |
| EP | 1 201 449 A2 | 5/2002 | B41J/29/393 |
| GB | 2 356 375 A | 5/2001 | B41J/2/36 |
| JP | 58-164368 | 9/1983 | H04N/1/22 |
| JP | 59-127781 | 7/1984 | B41J/3/20 |
| JP | 02-248264 | 10/1990 | B41J/2/365 |
| JP | 02-289364 | 11/1990 | B41J/2/36 |
| JP | 03-024972 | 2/1991 | B41J/2/36 |
| WO | WO 01/01669 A1 | 1/2001 | H04N/1/00 |

OTHER PUBLICATIONS

"NIP17: International Conference on Digital Printing Technologies", *New Thermal Offset Printing Employing Dye Transfer Technology (Tandem TOP–D)*, N. Taguchi, Y. Oochi, K. Nago.

Y. Shimazaki and S. Yoshida, AVC R&DD Group, AVC Company, Matsushita Electric Industrial Co., Ltd., Moriguchi, Osaka, Japan, pp. 499–503.

U.S. patent application Ser. No. 10/078,644, Bouchard et al., filed Feb. 19, 2002.

U.S. patent application Ser. No. 09/817,932, Bybell et al., filed Mar. 27, 2001.

U.S. patent application Ser. No. 09/934,703, Saquib et al., filed Aug. 22, 2001.

U.S. patent application Ser. No. 10/147,198, Bybell et al., filed May 16, 2002.

* cited by examiner

HIGH SPEED PHOTO-PRINTING APPARATUS

CROSS-REFERENCE TO RELATED APPLICATIONS

This application is a continuation-in-part of U.S. patent application Ser. No. 09/872,424, filed on May 30, 2001, entitled "A High Speed Photo-Finishing Apparatus," now abandoned, which is hereby incorporated by reference.

This application is related to the following commonly-owned patent applications, each of which is hereby incorporated by reference:

a nonprovisional application Ser. No. 10/078,644 entitled "Technique for Printing a Color Image," filed on Feb. 19, 2002;

application Ser. No. 09/817,932, filed on Mar. 27, 2001, entitled "Digital Halftoning";

application Ser. No. 09/934,703, filed on Aug. 22, 2001, entitled "Thermal Response Correction System"; and a concurrently-filed provisional application entitled "Method and Apparatus for Voltage Correction" Ser. No. 60/358,977, the benefit of which was claimed in application Ser. No. 10/147,198, filed May 16, 2002, now U.S. Pat. No. 6,661,443 B2."

BACKGROUND

A variety of photo-printing booths are known in the art. Coin operated, booths, having fixed-lens cameras, are well known. Such prior art photo-printing booths take a series of photographs or a single photograph of an individual or group of individuals sitting in the booth at a fixed location in front of the camera. The photographs are then developed within the booth and dispensed to the user. The booth enclosure provides a controlled background and lighting. The booth also serves to constrain the position and poses of the user, as well as limiting the number of persons within the field of view.

Illustrative systems of automatic photography equipment can be found in U.S. Pat. Nos. 3,820,133; 3,864,708; 4,072,973; 4,089,017 and 4,738,526. The photo-printing booths disclosed therein use self-developing equipment to allow for the adjustment of flash intensity and for coin actuation.

Other previous photo-printing systems have been developed to accept 35 mm film from a customer and develop it. A number of chemical processing fluids need to be used to develop and stabilize an image on photographic film. These processing fluids become less effective as the chemical components are consumed and, additionally, have a limited lifetime. Spent fluids must eventually be disposed of, either by pouring down a drain, by placing in a storage tank for later transportation and disposal, or by incineration. The principal component of these fluids is water. The photofinisher must either provide a drain and water supply, or deal with transporting large volumes of spent photographic waste to a proper disposal site. In an unattended apparatus, moreover, it is difficult to control the amount of chemicals being used. In order to ensure that the appropriate amount of processing solution is always available, an excess amount of the solution is typically provided. This, however, increases the amount of effluent that must eventually be disposed of.

In contrast to conventional photographic cameras, digital cameras do not use film to capture an image. There is, in this case, no need for any chemical processing to occur in a photo booth or photo vending machine. The analogous component to the negative of a conventional film camera is, in a digital camera, a removable or non-removable electronic memory. This memory can typically store many tens of photographs. The user of a digital camera may obtain the same print output experience as the user of a conventional camera by submitting the contents of the camera's electronic memory to be digitally printed onto conventional, chemically-developed print paper. This will, however, necessarily entail a period of waiting, because the time required to obtain the first print in a conventional chemical development process is typically a few minutes, even though the throughput thereafter is fast.

There are also now available customer-operated, stand-alone digital photovending systems in which other digital printing techniques are used to print the pictures. For example, ink jet, thermal transfer or direct thermal printing technology may be used. These systems often suffer from slow printing speeds, such that a print job of more than about ten pictures may take an unacceptably long time. Attempts have been made to increase the speed of these systems by incorporating several output printers working in parallel. Each of these printers may, for example, be a thermal transfer printer having a single thermal head. Such systems, however, are complex and expensive, and still do not achieve the desired printing speed.

Alternatively, the user of a digital camera may elect to print out the photographs at home, using one of the several commercially-available photo printers. In this case, the time taken to print out all the photographs is considerable (at least half a minute per photograph in the current state of the art). Other photo-printing systems have been developed, but these typically are not entirely customer operated, do not have image processing means, and/or are quite slow.

Furthermore, the perceptual quality of the hardcopy output produced by thermal printers is often less than optimal. For example, thermal printers are known to produce substantial deviations from intended image densities as a result of imperfect cooling following previously printed patterns. In addition, heat may diffuse laterally within the print head itself, causing further deviation from desired printing densities.

Another cause of suboptimal output quality is the fact that the voltage across any single heating element in a thermal print head element depends upon the total number of elements being powered at the same time. This dependence of voltage on the number of simultaneously-active elements may cause the actual output density of a pixel to deviate from the desired output density of the pixel.

Furthermore, thermal printers may employ halftoning to produce the appearance of a greater number of tones in the rendered output than the number of distinct, microscopic density levels the thermal printer is actually capable of printing. A bi-level thermal printer, for example, may use halftoning to simulate various shades of gray even though the printer is only capable of printing black dots. Conventional halftoning techniques, however, often exhibit various visual artifacts, particularly when separate dot patterns of different colors are overlaid to produce a colored image. For example, moire patterns and color nonuniformities may be produced, which reduce the perceptual quality of the printed image.

For the foregoing reasons, there is a need for a high-speed digital photo-printing vending machine that will produce images of excellent quality at low cost. There is also a need for a stand-alone unit that customers can use without assistance, and which requires less support in the form of supply replenishment and waste disposal than conventional photo vending machines.

SUMMARY

In one aspect, the present invention features a thermal printer comprising a plurality of thermal print heads, each of the plurality of thermal print heads being operable to print a distinct one of a plurality of colors; and dot size varying means for varying perceived levels of color printed by the thermal printer by varying sizes of dots printed by the plurality of thermal print heads. A first one of the plurality of thermal print heads may have a first number of thermal elements that is energizable at a first rate. A second one of the plurality of thermal print heads may have a second number of thermal elements that is energizable at a second rate.

The thermal printer may further comprise means for performing tone scale adjustment on an image to be printed, means for performing thermal history correction on the image to be printed, means for performing resistance profile correction on the image to be printed, means for performing dithering on the image to be printed, means for performing halftone dot location adjustment on the image to be printed, and means for performing common mode voltage correction on the image to be printed.

In another aspect, the present invention features a thermal printer comprising a plurality of thermal print heads, each of the plurality of thermal print heads being operable to print a distinct one of a plurality of colors, said plurality of thermal print heads being used to perform a thermal mass transfer method of printing selected from the group consisting of: (1) thermal mass transfer of a dye or pigment containing wax or resin, and (2) thermal mass transfer of an amorphous dye in combination with a thermal solvent.

The thermal printer may further comprise dot size varying means for varying perceived levels of color printed by the thermal printer by varying sizes of dots printed by the plurality of thermal print heads. A first one of the plurality of thermal print heads may have a first number of thermal elements that is energizable at a first rate. A second one of the plurality of thermal print heads may have a second number of thermal elements that is energizable at a second rate.

In a further aspect, the present invention features a thermal printer comprising a plurality of thermal print heads, means for performing tone scale adjustment on an image to be printed, means for performing thermal history correction on the image to be printed, means for performing resistance profile correction on the image to be printed, means for performing dithering on the image to be printed, means for performing halftone dot location adjustment on the image to be printed, and means for performing common mode voltage correction on the image to be printed. The means just described may be arranged to perform their respective functions in the order recited in the previous sentence.

In yet another aspect of the present invention, a digital photo-printing vending machine is provided which comprises image data input means for receiving at least one input image from a customer, payment means for receiving a payment from the customer for printing the at least one input image, and output means for printing the at least one input image from the customer, the output means comprising a plurality of thermal print heads. The output means may further comprise dot size varying means for varying perceived levels of color printed by the thermal printer by varying sizes of dots printed by the plurality of thermal print heads. Each of the plurality of thermal print heads may be operable to print a distinct one of a plurality of colors.

The plurality of thermal print heads may print output on an output medium at a plurality of A first one of the plurality of thermal print heads may have a first number of thermal elements that is energizable at a first rate. A second one of the plurality of thermal print heads may have a second number of thermal elements that is energizable at a second rate.

The at least one input image may comprise a plurality of input images, and the digital photo-vending machine may further comprise image file preparation means for converting the plurality of input images into a plurality of standardized images sharing a standardized file format. The image file preparation means may comprise image file initial standardization means for processing the plurality of input images to produce a plurality of initial standardized images, image file enhancement means for processing the plurality of initial standardized images to produce a plurality of enhanced images, and image file final standardization means for processing the plurality of enhanced images to produce the plurality of standardized images.

The digital photo-printing vending machine may further comprise a customer interface, which may comprise data entry means for receiving input from the customer, and display means for displaying output to the customer. The data entry means and the display means may be implemented using a single touch screen.

The digital photo-printing vending machine may further comprise a plurality of image data input means, means for receiving from the user a selection of a particular one of the plurality of image data input means, and means for using the selecting image data input means as the image data input means for receiving the at least one input image from the customer.

The at least one input image may comprise a plurality of input images, and the digital photo-printing vending machine may further comprise output selection means for receiving a selection from the customer of a subset of the plurality of input images. The output means may comprise means for printing the selected subset of the plurality of input images.

The digital photo-printing vending machine may further comprise client means. The client means may comprise the image data input means, the payment means, image file preparation means for converting the at least one input image into at least one standardized image having a standardized file format, and means for communicating with server means according to a client-server protocol. The server means may comprise image file processing means for processing the at least one standardized image to produce at least one processed image, and means for transmitting the at least one processed image to the output means for printing. The digital photo-printing vending machine may include the server means. Each of the client means and the server means may be implemented on distinct processor.

The output means of the digital photo-printing vending machine may further comprise roll-fed printing means for delivering a receiver element to the plurality of print heads, and cutting means for cutting the receiver element after the output means prints the at least one input image from the customer. The at least one input image may comprise a plurality of input images, and the cutting means may comprise means for cutting the receiver element between each of the plurality of input images.

The cutting means may comprise means for separating a section of the receiver element between each of the plurality of images, and the output means may further comprise means for disposing of the separated sections of the receiver element.

The output means may comprise means for printing information other than the at least one input image on a first section of the receiver element using fewer than all of the plurality of thermal print heads, and means for printing the at least one input image from the customer on a second section of the receiver element. The first section may precede the second section on the receiver element. The information other than the at least one input image may comprise, for example, a receipt for the customer and/or promotional material.

Yet another aspect of the present invention features a digital photo-printing vending machine comprising image data input means for receiving an input image from a digital camera provided by a customer, output means for printing the input image to produce a digital photograph; and means for providing the digital photograph to the customer.

The image data input means may comprise a receptacle for receiving the digital camera, the receptacle including an electrical connector for connecting to an output port of the digital camera. The image data input means may comprise a wireless receiver for receiving the input image from the digital camera over a wireless connection. The digital photo-printing vending machine may further comprise means for withholding the digital camera from the customer subsequent to printing the input image. The digital photo-printing apparatus may further comprise disabling means for preventing the digital camera from capturing additional digital photographs.

The disabling means may comprise means for identifying the number of digital photographs stored within a memory of the digital camera, means for determining whether the identified number of digital photographs exceeds a maximum number of digital photographs, and means for preventing the digital camera from capturing additional digital photographs if it is determined that the identified number of digital photographs exceeds the maximum number of digital photographs.

The disabling means may comprise means for identifying an amount of time that the digital camera has been in use, means for determining whether the identified amount of time exceeds a maximum amount of time, and means for preventing the digital camera from capturing additional digital photographs if it is determined that the identified amount of time exceeds the maximum amount of time.

These and other features and advantages of various embodiments of the present invention will be more readily apparent from the following detailed description and the accompanying drawings.

DETAILED DESCRIPTION

In one aspect, the present invention features a high speed digital photo-printing apparatus that utilizes a plurality of thermal print heads. In one embodiment, the digital photo-printing apparatus is a customer-operated, stand-alone vending machine. Such a vending machine may be less expensive and easier to maintain than conventional photo-printing vending machines, thereby enabling small retail establishments to enter the digital photo-printing business. The apparatus may print digital images at high speeds, such as about 20–60 pictures per minute. These high speeds may be obtained by using a thermal transfer printer with multiple thermal print heads, each head printing a separate color. The photo-printing apparatus may also have multiple input means so that a user may input images from a variety of sources. The photo-printing apparatus may include a housing to substantially contain the various components that the apparatus uses to perform the functions described herein.

Figure 1A:
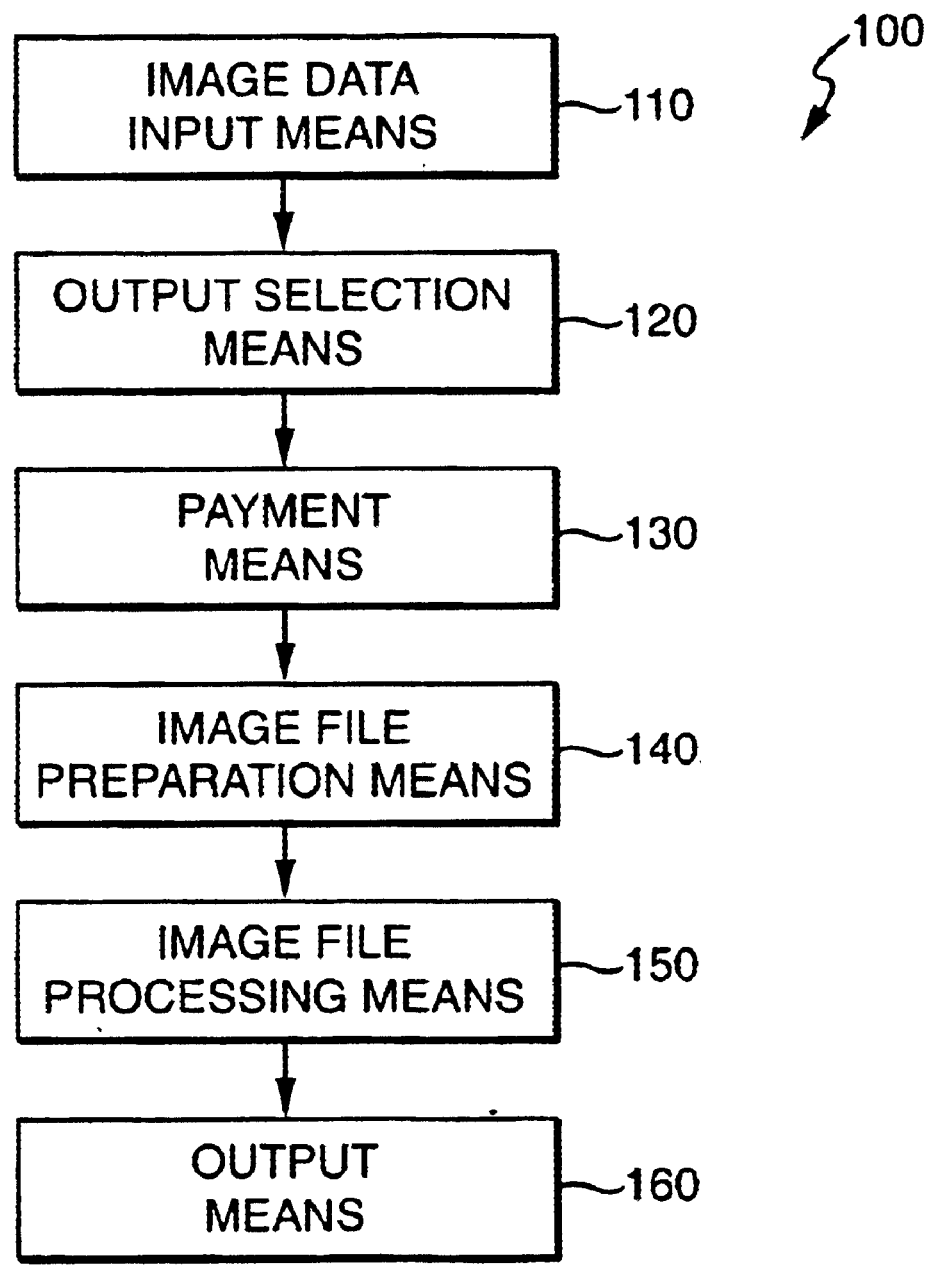
FIG. 1A is a block diagram of a high speed digital photo-printing apparatus according to one embodiment of the present invention.

Referring to FIG. 1A, in one embodiment of the present invention, a digital photo-printing apparatus 100 is provided. The photo-printing apparatus includes photo-printing image data input means 110, output selection means 120, payment means 130, image file preparation means 140, image file processing means 150, and output means 160.

Figure 1B:
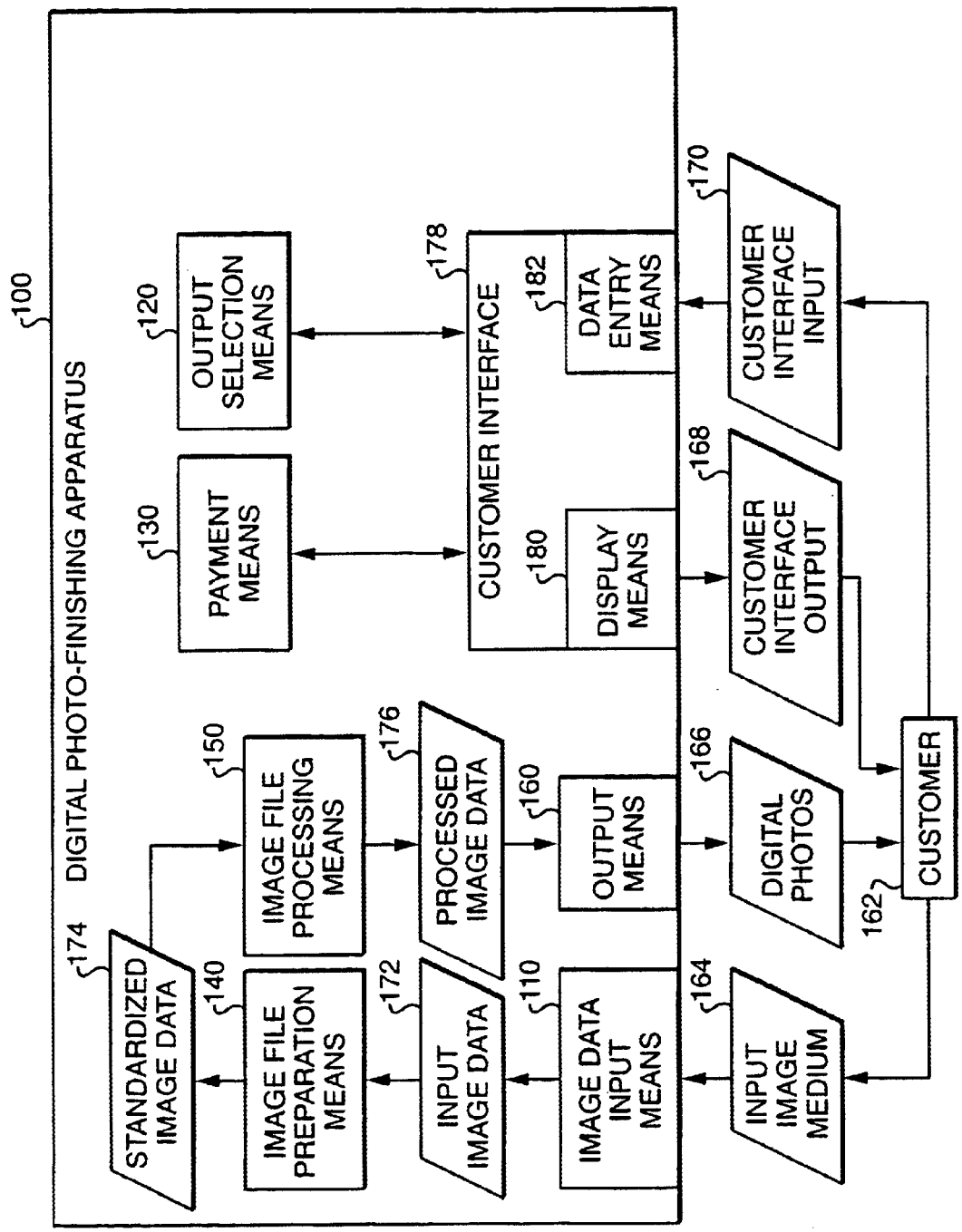
FIG. 1B is a dataflow diagram illustrating the operation of the digital photo-printing apparatus of FIG. 1A according to one embodiment of the present invention.

FIG. 1A illustrates components of the photo-printing apparatus in the sequence in which such components operate in one embodiment of the present invention. Referring to FIG. 1B, a dataflow diagram is shown which illustrates the flow of data through the photo-printing apparatus in one embodiment of the present invention. The photo-printing apparatus 100 may, for example, be a vending machine which conducts a transaction with a customer 162.

The photo-printing apparatus 100 includes a customer interface 178 for interacting with the customer 162. The customer interface 178 may include data entry means 182 for receiving customer interface input 170 from the user and display means 180 for displaying customer interface output 168 to the user. As described in more detail below, the customer interface 178 may interact with other components of the photo-printing apparatus 100 and permit the user to make various choices during the transaction. The customer interface 178 may, for example, allow the user to select a desired image data input means and payment means, and to exercise options with respect to image selection, number of prints, image processing, and output formats. Features of the customer interface 178 may be implemented in software executing on a processor (not shown) within the photo-printing apparatus 100.

The display means 180 may, for example, be an interactive video monitor for displaying instructional order information which is used by the customer 162 for entering appropriate order information. The display means 180 may also be used for various other functions as described later herein, for example, but not by way of limitation, the display device may be used to preview images prior to printing of the images, and used as a touch screen for customer order selections.

The data entry means 182 may be any means for receiving input from the user, such as a keyboard, touch screen, mouse, card reader for reading a previously-issued customer order card (which could include customer photo-printing preferences), or any combination thereof. The data entry means 182 and display means 180 may be implemented using a single component, as in the case where both the data entry means 182 and display means 180 are implemented using a single touch screen.

As shown in FIGS. 1A and 1B, in one embodiment the customer 162 possesses an input image medium 164 containing one or more input images (e.g., digital photographs) to print. The input image medium 164 may be any of a variety of kinds of input media, such as PCMCIA cards, ZIP disks, compact flash cards, Smart Media, Memory Sticks, CDs, floppy disks, photographic negatives or prints, or a digital camera.

If the input images are stored electronically on the input image medium 164, each input image may be stored in a separate file. File formats suitable for storing digital images include but are not limited to JPEG, TIFF, and BMP. One or more of the input images may be compressed into a single file (such as a ZIP file) on the input image medium 164.

The first step of the transaction between the customer 162 and the photo-printing apparatus 100 is for the customer 162 to provide the input image medium 164 to the photo-printing apparatus 100 using the image data input means 110. The image data input means 110 extracts the input image(s) from the input image medium 164 to produce input image data 172.

The image data input means 110 may include any of a variety of data storage/retrieval devices, including but not limited to CD drives (such as CD-ROM, CD-R, and CD-RW drives), PCMCIA card slots, floppy disk drives, zip disk drives, scanners, smart media readers, and compact flash media readers. The image data input means 110 may also include a wireless device that is capable of communicating with a camera, computer, or hand-held device over a wireless (e.g., infrared or radio) connection. The image data input means 110 may include one or more devices that communicate over a direct physical connection, such as a cable connection to a camera, scanner, internet, or other device or network.

Although the input image medium 164 may be any of various kinds of media, certain kinds of image data input means 110 may only be capable of receiving certain kinds of media. If, for example, the image data input means 110 is a CD drive, the input image medium may be a CD.

When the image data input means is a camera, the function of a "single-use" film camera may be mimicked. In this case, a special disposable digital camera may be sold to the customer 162 at retail. After taking up to as many pictures as will occupy the memory provided within the camera, the customer may deliver the camera to a receptacle in the photo-printing apparatus 100. The data may then be transferred from the camera to the photo-printing apparatus 100 by direct electrical or wireless connection, allowing the apparatus 100 to deliver printed pictures to the customer 162. The camera may be preprogrammed to become inoperable after a preset number of photographs have been taken, after a preset time, after a preset amount of camera memory has been filled, or after a predetermined number of photographs have been printed, thereby terminating the transaction. Upon return to the manufacturer, the camera unit may be reprogrammed or remanufactured, allowing reuse of critical components and reducing the cost of a camera. Alternatively, the photo-printing apparatus 100 of the present invention may disable the camera, by some mechanical or electrical means, after printing a predetermined number of photographs, after determining from digital information in the camera that a preset number of photographs have been taken or printed, or that a preset period of time has been exceeded, or that a preset amount of memory has been filled. Means of disabling the camera may include, for example, electrically damaging a critical link or component in the electrical circuit, disabling a shutter or lens system, or permanently changing configuration information stored in the camera. Prior to disabling the camera, it may be a function of the kiosk to offer the customer an option to store the digital photographs on a storage medium such as CD-ROM, using one of the output means 160, or to transfer the digital photographs to an accessible network location for later use.

In another embodiment, the camera may be reusable, and may be provided to the customer 162 on a loan or rental basis. In this embodiment, the camera is designed for controlled-use rather than single-use. The camera may be preprogrammed to allow use only with selected photo-printing booths, and/or to limit the number of photographs, the total number printed, the total memory usage, or the amount of time for which the camera will be operable, thereby enforcing terms for the loan or rental that may lower the transactional cost. In this embodiment, the camera is temporarily disabled when the limits of use have been exceeded, but may be re-enabled upon the arrangement of a subsequent loan or rental. The initiation or renewal of a loan or rental may be implemented as one of the user-selectable functions of the photo-printing apparatus 100. Prior to disabling the camera, it may be a function of the kiosk to offer the customer an option to store the digital photographs on a storage medium such as CD-ROM, using one of the output means 160, or to transfer the digital photographs to an accessible network location for later use.

The photo-printing apparatus 100 may include multiple image data input means. For example, the photo-printing apparatus 100 may include readers for compact flash memory and/or Memory Sticks®, a scanner, and/or a floppy disk or CD drive. The customer interface 178 may prompt the customer 162 (using the display means 180) to select a particular one of the photo-printing apparatus' image data input means through which to provide the input image data 172. Alternatively, selection of a particular image data input means may be automatic, being triggered, for example, by insertion of the media into one of the image data input means 110. The customer 162 may select an image data input means using the data entry means 182 and then input the input image data 172 using the selected image data input means 110. The customer interface 178 may confirm whether the input image data 172 was successfully loaded.

The photo-printing apparatus 100 may store the input image data 172 (e.g., in one or more files on a hard disk drive) for further processing. Although the customer 162 may provide the input image data 172 on the input image medium 164 in a format that is suitable for direct transmission to and storage by the photo-printing apparatus 100 without any additional processing, it should be appreciated that the photo-printing apparatus 100 may perform some processing on the image data provided by the customer 162 in the process of receiving such data and storing it as input image data 172. If, for example, the image data input means 110 is a scanner, the scanner may scan the image(s) on the photographic negative or print (or other output medium) provided by the customer 162 and convert such images into a digital electronic format suitable for storage as input image data 172.

The output selection means 120 may perform the following steps. In one embodiment of the output selection means 120, the customer interface 178 uses the display means 180 to display to the customer 162 all or a selected group of the printable pictures contained within the input image data 172. These pictures may be pictures which the customer 162 has preselected from all pictures in the input image data 172 using a protocol such as digital print order format (DPOF). The customer interface 178 may allow the customer 162 to use the data entry means 182 to select which pictures to print and to specify the number of copies of each selected picture to print. The customer interface 178 may also prompt the customer to select the size(s) of print he or she desires. For example, the customer 162 may choose one large image or four small images, each being ¼ the size of the former.

Alternatively, the customer 162 may elect to print one or two copies of every available picture in the camera memory in a standard size (typically approximately 4" by 6"), thereby giving the customer the same output as he or she would normally expect from a conventional photographic photo-finishing establishment.

The payment means 130 may perform the following steps. The payment means 130 may enable the customer 162 to specify a desired payment method using the data entry means 182. Selectable payment methods may include, for example, debit card, credit card, cash, e-cash, or electronic cash transfer. The payment means 130 may receive and process payment from the customer 162. The payment means 130 may, for example, be coupled with the housing of the photo-printing apparatus 100.

In one embodiment, the payment means 130 includes a credit card reader which includes a slot for receipt of a credit card. In an alternate embodiment, the payment mechanism is capable of receiving cash payment. It should be appreciated that credit card payment and cash payment are described herein merely as examples of the kinds of payments that may be used, and do not constitute limitations of the present invention.

In the event that the payment method requires authorization, the payment means 130 determines whether payment is approved or declined. To perform such authorization, the payment means 130 may, for example, establish a network connection to a payment authorization service, such as a credit card authorization service, which may approve (or alternatively may decline) authorization for the customer's offered payment.

If the payment means 130 determines that the customer's offered payment is not authorized, the payment means 130 does not allow the customer to continue with the transaction. If the payment means 130 determines that the customer's offered payment is authorized, then the payment means 130 allows the customer to proceed with the transaction in compliance with the instructions of the customer interface 178.

In one embodiment, the photo-printing apparatus 100 includes network connection means (not shown) that enables the vending machine 100 to perform the following functions: a) authorize the customer's payment; b) optionally store the customer's image data at a remote site; c) provide maintenance and/or media replenishment information to a remote monitor. The network communications means may establish a network connection over any type of network, such as the Internet, a Plain Old Telephone Service (POTS) network, an ISDN network, a fiber optic network, or a wireless network. The network communications means may, for example, be a standard modem or network interface card.

The customer 162 may connect a PC or other networked device to the photo-printing apparatus 100 through a locally accessible network.

In one embodiment, the image file preparation means 140 and image file processing means 150 process the input image data 172 provided by the customer 162 in order to improve the perceptual quality of the input image data 172 when printed by the output means 160. The image file preparation means 140 and image file processing means 150 may operate in a manner that depends on the particular output means 160 utilized by the photo-printing apparatus 100. Particular embodiments of the image file preparation means 140 and the image file processing means 150 are described hereinbelow in reference to FIG. 3, FIG. 4 and FIG. 5. Output means 160 may include a photo-printer, a receipt printer, and a digital output means such as a CD-ROM writer.

In one embodiment, the output means 160 includes means for printing and delivering processed image data 276 (described in more detail below) to the customer 162 using a multi-head thermal printer system. The multi-head printer of the present invention may use any of myriad types of thermal transfer printing. For example, a first type of thermal transfer printing that may be used is dye diffusion thermal transfer printing. In this process a dye diffuses from a polymer on a donor into a second polymer on a receiver. A second type of thermal transfer printing that may be used is thermal mass transfer of a fusible colorant. This system may be wax based or resin based. A third type of thermal transfer printing that may be used is thermal mass transfer of an amorphous dye in combination with a thermal solvent. This system has the advantage of printing at very high speeds and also at high quality levels. The details of this thermal transfer process are set forth in U. S. patent application Ser. No. 09/745,700, filed Dec. 21, 2000, entitled: "Thermal Transfer Recording System", having co-inventors Michael J. Arnost, Alain Bouchard, Yongqi Deng, Edward J. Dombrowski, Russell A. Gaudiana, Fariza B. Hasan, Serajul Haque, John L. Marshall, Stephen J. Telfer, William T. Vetterling and Michael S. Viola, now U.S. Pat. No. 6,537,410 B2 and in U.S. provisional patent application serial No. 60/294,528, filed May 30, 2001, entitled: "Thermal Mass Transfer Imaging System", having co-inventors Edward P. Lindholm, Stephen J. Telfer and Michael S. Viola, both of which are assigned to the assignee of the instant application, and both of which, along with all of their incorporated-by-reference patents and patent applications, are hereby incorporated by reference herein in their entireties.

As described above, in one embodiment the output means 160 is a thermal transfer printer having multiple thermal print heads. Such printers achieve a higher throughput than the more commonly used thermal printer designs in which a single thermal head is used and the colors are printed one after another. Thermal printers having multiple thermal print heads are well known in the art. For example, U.S. Pat. Nos. 4,385,302, 4,447,818, and 4,540,992, describe versions of such machines.

U.S. Pat. Nos. 5,285,220 and 5,711,620 describe multi-head thermal printers for use with a single-sheet, direct thermal medium, rather than a two-sheet thermal transfer medium. In this case, one color is fixed by exposure to ultraviolet or visible radiation before the next is printed, with the result that the medium is photosensitive. The two-sheet, thermal transfer printers described above have the advantage that the media used in such printers are not photosensitive.

Figure 2:
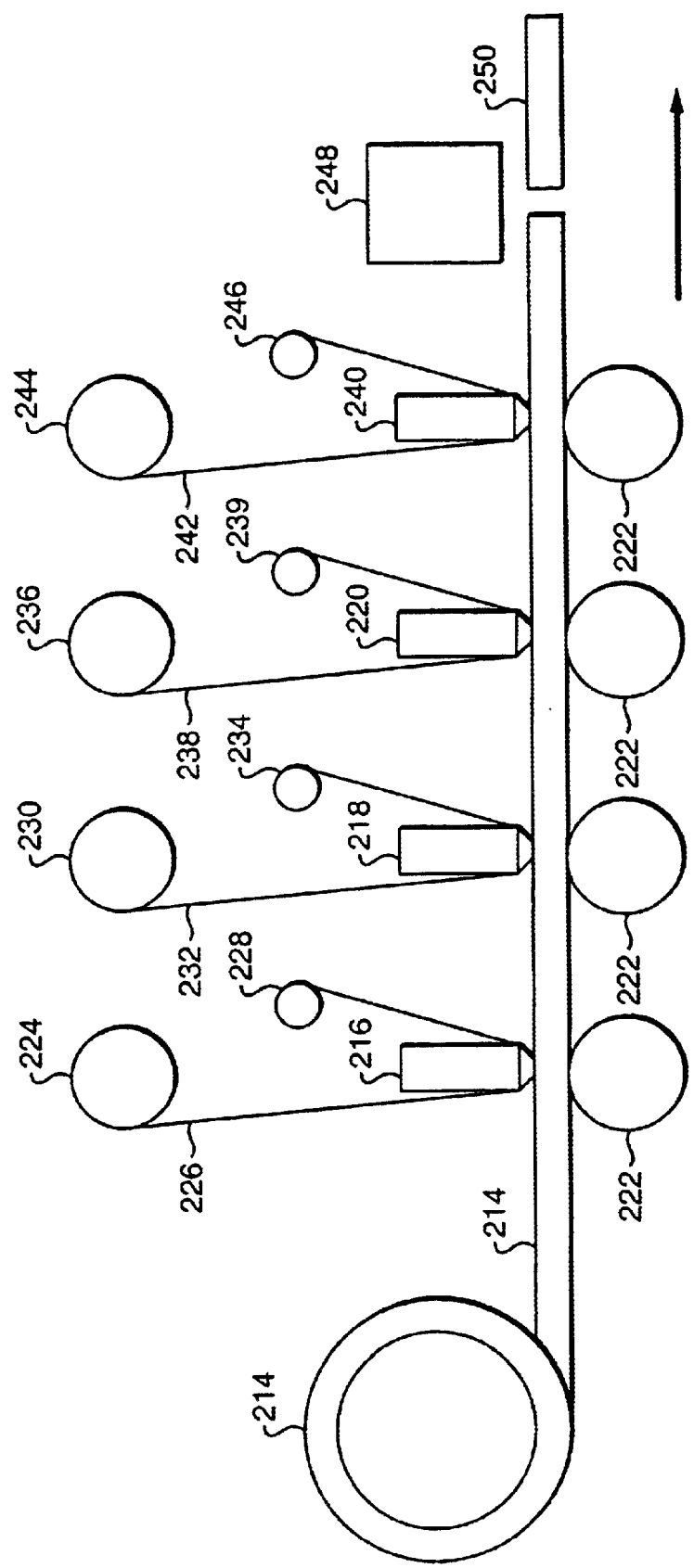
FIG. 2 is a full sectional side elevational view of a first embodiment of the output means of the digital photo-printing apparatus of FIG. 1A.

One embodiment of the output means 160 for the vending machine is illustrated in FIG. 2. Referring now to FIG. 2, there is a receiver element 210, fed from a roll 214. Although the path of receiver element 210 is shown as straight in FIG. 2, it should be understood that other paths, for example curved or arcuate paths, may also be used. The receiver is translated past three thermal print heads 216, 218 and 220, opposed by platen rollers 222. The first thermal print head is fed from roller 224 with a donor element 226, bearing the first of the three subtractive primary colors (cyan, magenta, or yellow). The order of printing of the colors may vary. After printing of the first color, the spent donor element is taken up on a roller 228. The second thermal print head 218 is fed from roller 230 with donor element 232, corresponding to the second primary color. The spent donor element is taken up on roller 234. The third print head 220 is fed from roller 236 with donor element 238, corresponding to the third primary color. The spent donor element is taken up on roller 239. A fourth printing head (or heating element) 240 may be used for optionally applying an overcoat layer 242, which may be laminated or transferred to receiver element 210. Alternatively, 242 may be a white, opaque substrate as described in more detail below. Element 240 may be a thermal print head, a heated roller, or simply a pressure roller. The overcoat or white opaque substrate 242 is fed from roller 244. If a carrier web is used for the overcoat or white opaque substrate 242, it is taken up on roller 246. If no carrier web is used, substrate 242 is simply laminated to receiver element 210, and roller 246 is not needed. Following lamination or transfer of substrate 242, a cutter 248 is used to separate the printed pictures, affording a final image 250 onto which all three primary colors have been printed. The cutter may optionally separate a small sliver of receiver material 210 between pictures so as not to have to precisely register a single cut with the junction between successive pictures. The slivers so separated may be directed into a receptacle for later disposal. The prints themselves may be delivered to the customer by means of a chute or similar device.

It will be appreciated that between the position of separation of the last print of one print job by cutter 248 and the position of the beginning of printing of the next print job by thermal print head 216 is a section of receiver element 210 onto which no customer-specific full-color image may be printed. This section of receiver element 210 may either be printed with non-customer-specific information (for example, promotional material) or with monochrome or bichrome customer-specific data (for example, a receipt). In either case, the output may be delivered to the customer ordering the second of the two print jobs described above. Alternatively, this section of receiver element 210 may be directed into the receptacle for later disposal.

Donor elements 226, 232 and 238 may comprise very thin substrates (of thickness typically in the range 2.5–8 micrometers) onto which the appropriate donor material has been coated. In the case of dye diffusion thermal transfer, the donor material is typically a dye incorporated into a polymer binder, as described for example in Hann, R. A. and Beck, N. C., J. Imaging Technol., (1990), 16(6), 238–241 and Hann, R. A., Spec. Pub. R. Soc. Chem. (1993), 133, 73–85.

In the case of thermal mass transfer, the donor material is commonly a dye or pigment formulated with a wax or resin (or a combination of the two) as vehicle, as described for example in U.S. Pat. No. 5,569,347.

In one embodiment of the present invention, however, thermal mass transfer imaging is used wherein the donor element is such as is described in U.S. patent application Ser.No. 09/745,700, now U.S. Pat. No. 6,537,410 B2, cited above.

The receiver element 210 should be chosen so as to be compatible with the donor material used. Thus, for dye diffusion thermal transfer, the receiver element 210 bears a polymer coating for accepting the transferred dyes, as described in Hann, R. A. and Beck, N. C., J. Imaging Technol., (1990), 16(6), 238–241 and Hann, R. A., Spec. Pub. R. Soc. Chem. (1993), 133, 73–85. For thermal mass transfer, the receiver element may bear a microporous layer, as described for example in U.S. Pat. Nos. 5,521,626 and 5,897,254, or a softening layer, as described for example in U.S. Pat. No. 4,686,549. As described for example in U.S. Pat. No. 5,244,861, the receiver elements 210 used for thermal transfer media of either type are desirably compliant and of uniform thermal conductivity.

One example of the receiver element 210 for use in conjunction with a thermal mass transfer donor element according to the invention is described in U.S. provisional patent application Ser. No. 60/294,528, cited above.

Receiver element 210 may be opaque or transparent. In the case where receiver element 210 is transparent, and a reflective print is the desired output, substrate 242 is desirably opaque, and the final image is viewed through receiver element 210. In the case wherein receiver element 210 is opaque, and the material transferred by element 240 is transparent, the final image is viewed through the material transferred by element 240. The image printed in one case is the mirror image of that printed in the other.

Variation in level of color in an image produced by thermal transfer printing may be achieved by means of two general methods. In the first method, the area coverage of dye is approximately constant over the whole area of a pixel, and the amount of dye (the dye "density") of approximately constant coverage varies according to the amount of energy supplied by the print head to that particular pixel. This method is hereinafter referred to as "variable density" printing, and is commonly practiced in dye diffusion thermal transfer. In the second method, the size of dots within the area of one pixel varies according to energy supplied by the print head, these dots containing only essentially a single density of dye (de facto, its maximum density). The dots are so small that they cannot be individually distinguished by the naked eye, and so the overall level of color is perceived as an average of the almost total absorption of light in the proportion of the viewed area occupied by dots, and the almost complete (diffuse) reflection of light in unprinted areas. This technique of thermal transfer printing is known hereinafter as "variable dot" printing.

In one embodiment of the present invention, the donor elements described above are used in combination with the receiver described above, and the variable dot method is employed.

As described in the above-referenced patent application entitled "Technique for Printing a Color Image," in a multi-head thermal transfer printing system a serious problem of misregistration may occur in the color images produced by superimposed dot patterns. Such misregistration may occur as a result of print head misalignment, speed variations in the media transport, stretching of the media and other mechanical problems that are difficult to control with adequate precision, and may result is moire patterns or other visible artifacts such as color variations. A solution to this problem is disclosed therein which intentionally misregisters superimposed dots in a novel and particular manner to achieve image optimization. In a particular embodiment a first thermal print head has a first number of thermal elements energized at a first rate and a second thermal print head has a second number of thermal elements energized at a second rate. The numbers of thermal elements and rates of energization are selected to cause a pattern of intentional misregistration at a high spatial frequency, which is unnoticeable to the naked eye of a viewer of the image, and which masks the unintentional misalignments caused by mechanical misalignment and other factors noted above.

In one embodiment of the above-referenced patent application entitled "Technique for Printing a Color Image," thermal imaging is used and the surface onto which printing is performed is a receiver substrate. The substrate is typically a web and is reeled in a first direction at a first speed. First, second, and third thermal print heads are displaced from each other in the first direction and are each fixedly mounted relative to the moving receiver. The first head includes a first predetermined number of elements linearly and regularly displaced over a fixed distance in a direction parallel to the surface and perpendicular to the first direction. This fixed distance defines one dimension of a field of view of the image. The second head includes a second predetermined number of elements linearly and regularly displaced over the fixed distance within the field of view and in a direction parallel to the surface and perpendicular to the first direction. The third head includes a third predetermined number of elements linearly and regularly displaced over the fixed distance within the field of view and in a direction parallel to the surface and perpendicular to the first direction. Separate ink donor ribbons in the colors of cyan, magenta, and yellow are used with the three print heads. Any order of printing of the colors may be used. However, as described in the above-referenced patent application entitled "Technique for Printing a Color Image," the visible effects of misregistration occur chiefly as a result of misregistration between magenta and the two other colors. Therefore, in a three head system, the resolution of the print heads used to print yellow and cyan may be the same, whereas the resolution of the print head used to print magenta may be different from the resolution of either the print head used to print yellow or the print head used to print cyan. When a fourth head associated with black is included, resolution of that fourth head may differ from resolutions of the three remaining heads.

In yet another feature of the above-referenced patent application entitled "Technique for Printing a Color Image," there is a first predetermined distance between dots along a first direction (the direction of media transport) and a second predetermined distance between dots along a second direction (perpendicular to the direction of media transport), and the first and second predetermined distances are controlled in the following manner. A clock generator generates a plurality of timing clock pulse trains. A computer-controlled pulse generator is operatively coupled to the clock generator and provides a plurality of outputs of excitation pulse bursts in timed sequence with at least one of the clock pulse trains. The first predetermined number of thermally controlled print head elements of the first print head are operatively coupled to one or more outputs from the pulse generator. The second predetermined number of thermally controlled print head elements of the second print head are operatively coupled to one or more outputs from the pulse generator. The third predetermined number of thermally controlled print head elements of the third print head are operatively coupled to one or more outputs from the pulse generator. The spacing of dots along the first direction is determined by the time intervals between pulse bursts. As discussed in the above-referenced patent application entitled "Technique for Printing a Color Image," the time intervals for the head printing yellow may be made the same as the time intervals for the head printing cyan, insofar as there is usually only minor spectral overlap between these two dyes.

In a particular embodiment of the above-referenced patent application entitled "Technique for Printing a Color Image," which may be used to implement output means 160 of FIGS. 1A–1B of the instant invention, each element of the cyan-printing head and each element of the yellow-printing head deposit 400 dots per inch on the surface within the field of view of the image, with each respective one of the 400 dots per inch from the yellow-printing head intending to be deposited upon its corresponding one of the 400 dots per inch from the first print head. Since there is minimal spectral overlap between these colors, although being subjected to a dot-on-dot procedure, precise registration of the yellow and cyan dots is unnecessary. Each element of the print head which prints magenta is controlled to deposit 266 dots per inch on the surface throughout the field of view. The intermingling of a column of 300 dots per inch by a row of 400 dots per inch pattern with a column of 400 dots per inch by a row of 266 dots per inch pattern over the field of view in this manner has the property of enhancing color uniformity of the image for the viewer, each one of the dots being individually indistinguishable to a naked eye of the viewer. Other colors and combinations of numbers of dots may be used.

Figure 3:
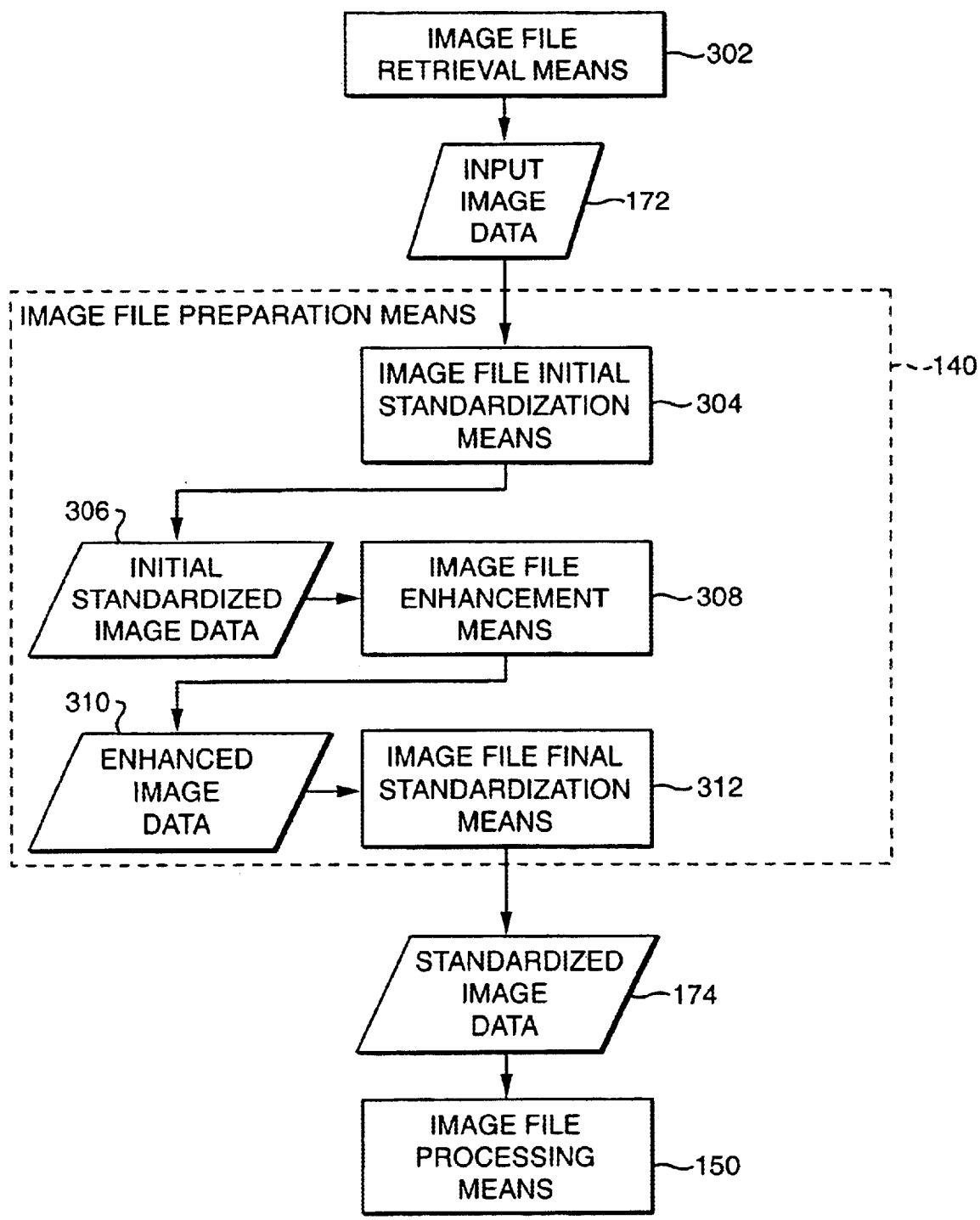
FIG. 3 is a block diagram of one embodiment of the image file preparation means of the digital photo-printing apparatus of FIG. 1A.

Turning now to FIG. 3, there is illustrated therein, in more detail, one embodiment of the image file preparation means 140 of FIGS. 1A–1B. Image data input means 110 (FIGS. 1A–1B) includes image file retrieval means 302, which allows image data to be read in any of a number of image file formats from any of various kinds of media, as described above.

Image file preparation means 140 includes image file initial standardization means 304, which receives the input image data 172 as input from the image file retrieval means 302. Image file initial standardization means 304 performs initial standardization functions on the input image data 172 to produce initial standardized image data 306. The image file initial standardization means 304 may, for example, perform the following operations on each input image file within the input image data 172: file decompression (if needed), image cropping to a standard aspect ratio (typically 2:3), file format conversion to a common image file format, such as JPEG or GIF (if needed), and downsizing to standard pixel dimensions (typically 1248 by 1872 pixels) if the input image file has larger dimensions than this. If an input image file is smaller than the standard size, it is not resized until later (as described in more detail below with respect to image file final standardization means 312).

The image file initial standardization means 304 may also assign each pixel in each input image an RGB color value at a resolution of 8 bits per pixel. If the input image is gray scale, or otherwise not RGB color, the input file initial standardization means 304 may transform it into RGB color. Finally, if the input image is in the nonstandard orientation, the input file initial standardization means 304 may rotate it into the standard orientation.

The foregoing operations results in initial standardized image data 306 (which may take the form of one or more image files corresponding to the image files in the input image data 172) that may then be further transformed by image file enhancement means 308, as will now be described. Image file enhancement means 308 performs the functions of sharpening, exposure correction, color balance correction, and color matching on each of the image files in the initial standardized image data 306. During these procedures, the initial standardized image data 306 are transformed into and replaced by enhanced image data 310. The enhanced image data 310 may take the form of a plurality of image files, each of which has the same image file format as a corresponding one of the image files in the initial standardized image data 306.

The methods described in U.S. Pat. No. 5,694,484 to Cottrell et al., entitled "System and Method for Automatically Processing Image Data to Provide Images of Optimal Perceptual Quality," issued on Dec. 2, 1997, which is hereby incorporated by reference herein, may be used by image file enhancement means 308 to provide an image of optimal perceptual quality when rendered by a hard copy output device of known characteristics.

The image quality of the output rendered by the output means 160 of FIGS. 1A–1B is principally defined by four image parameters: image sharpness, graininess, tonal rendition and color rendition. The four principal image parameters may be quantified by objective metrics and described by characteristic data. For example, the sharpness of an imaging device may be characterized by its modulation transfer function, its granularity by its Wiener spectrum, its tonal reproduction by its density response characteristic, and its color reproduction by a color difference metric such as $\Delta E^*$ of the CIELAB $L^*,a^*,b^*$ color specification system, as described for example in "Color and its Reproduction" by Gary G. Field, GATFPress, Pittsburgh, Pa., 1999. (CIELAB is the second of two systems adopted by CIE—the Comission Internationale de l'Eclairage—the International Commission on Illumination.) The system and methods of U.S. Pat. No. 5,694,484 may be used to generate processing operation parameter information, such as the defining parameters of sharpening and noise reduction filters, from the characteristic data of the input component and the output component, as well as an overall system objective metric. When the input component and the output component are known in advance, the generation of the processing operation parameter information can occur separately (for example during the design of the photo-processing system) from the image processing. Once the components are known, their characteristics can be obtained and device profiles can be constructed in the manner described in U.S. Pat. No. 6,128,415 to Hultgren et al., entitled "Device Profiles for Use in a Digital Image Processing System," issued on Oct. 3, 2000, which is hereby also incorporated by reference herein. If the input devices are not known, as in the case of an input data file from a computer readable medium, the input device spatial characteristics may be obtained using the methods of U.S. Pat. No. 6,069,982 to Reuman, S. R., entitled "Estimation of Frequency Dependence and Grey-Level Dependence of Noise in an Image," issued on May 30, 2000, which is hereby also incorporated by reference herein, and of U.S. patent application Ser. No. 09/409,459, entitled "Method and Apparatus for Estimating the Spatial Frequency Response of a Digital Image Acquisition System from the Images it Produces," S. R. Reuman, filed on Sep. 30, 1999, which is hereby also incorporated by reference herein.

Tonal rendition may be performed by executing a mapping from output of the image file initial standardization means 304 (an sRGB file) to a file suitable for printing within the limitations of the output means 160 of FIGS. 1A–1B. This mapping includes tone scale manipulation. Tone scale manipulation not only smoothly compresses the tone scale of the image(s) in the initial standardized image data 306 into the dynamic range available to the output means 160 of FIGS. 1A–1B, as specified by its black and white points (maximum and minimum densities of each color), but also allows for local manipulation of the contrast. The methods of U.S. Pat. No. 5,809,164 to Hultgren, Bror O. III, entitled "System and Method for Color Gamut and Tone Compression Using an Ideal Mapping Function," issued on Sep. 15, 1998, which is hereby also incorporated by reference herein, and the methods of U.S. Pat. No. 5,694,484, referenced above, may be used to obtain psychovisually optimized tonal rendition.

Using the above referenced systems and methods, the parameters of the processing operation performed by the image file enhancement means 306 may be determined so that the processing yields processed data that leads to psychovisually enhanced output when rendered by the output means 160. The image processing steps described above may be made optional depending on the customer's preferences. In addition, the customer may choose only certain processing options rather than all of them.

Referring again to FIG. 3, image file final standardization means 312 receives the enhanced image data 310 and changes the size of any files contained therein which were initially smaller than the standard size to the standard size. The image file final standardization means 312 outputs standardized image data 174. All images in the standardized image data 174 have the same file format and share other properties as a result of the processing described above.

As shown in FIGS. 1A–1B, the standardized image data 174 output from image file preparation means 140 is sent to image file processing means 150. Although image data input means 110, output selection means 120, payment means 130 and image file preparation means 140 may all include processes running on the same CPU, this is not a requirement of the present invention. Rather, in one embodiment, image data input means 110, output selection means 120, payment means 130, and image file preparation means 140 execute on a first processor which acts as a client. The image file processing means 150 executes on a second CPU which acts as a server. The first and second CPUs may be connected to each other via a network within or external to the photo-printing apparatus 100. More than one client may be connected to the server, and these clients may be configured identically to or differently from one another. For example, one client may handle input from a scanner, while another may handle input from a CD-ROM reader.

The first (client) CPU may transmit the standardized image data 174 to the second (server) CPU over the network. The server CPU may process the standardized image data 174 as described above to produce processed image data 176. The server CPU may transmit the processed image data 176 to a printer controller within the output means 160. The printer controller may incorporate a third processor, which may be a Field Programmable Gate Array (FPGA). The image file processing means 150 may be implemented solely by the server CPU or may be distributed between the server CPU and the FPGA, as described below. It should be understood that the architecture described above is only one of many alternatives, as will be readily apparent to one of ordinary skill in the appropriate art. In particular, the client and server need not each be implemented on a particular CPU. Rather, each of the client and server may be implemented using any appropriate combination of hardware and/or software and communicate with each other using any appropriate client-server protocol.

Figure 4:
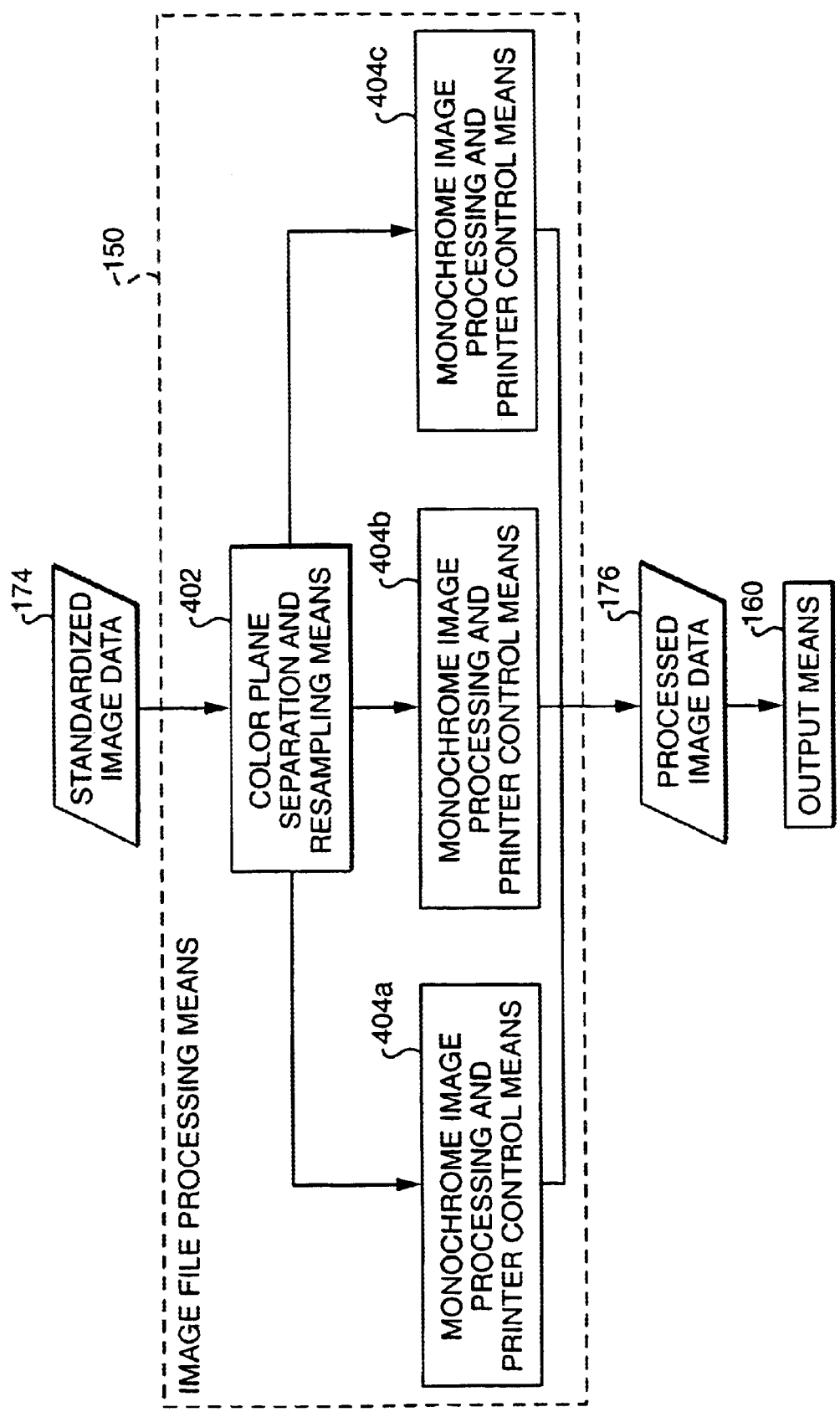
FIG. 4 is a block diagram of one embodiment of the image file processing means of the digital photo-printing apparatus of FIG. 1A.

FIG. 4 shows the operation of one embodiment of image file processing means 150 of FIGS. 1A–1B in more detail. In general, image file processing means 150 processes the standardized image data 174 to produce processed image data 176. The image file processing means 150 provides the processed image data 176 to the output means 160, which prints the image(s) contained within the processed image data 176, thereby producing digital photos 166 on an output medium. The photo-printing apparatus 100 provides the digital photos 166 to the customer 162, such as by dispensing the digital photos 166 through a chute to an output tray.

Operation of the image file processing means 150 according to the embodiment illustrated in FIG. 4 will now be described in more detail. Although the image file processing means 150 performs the following steps for each standardized image file in the standardized image data 174, operation of the image file processing means 150 will be described with respect to a single standardized image file in the standardized image data 174 for ease of explanation. Image file processing means 150 includes color plane separation and resampling means 402, which separates the standardized image file into yellow, magenta, and cyan color planes, and which separately resizes each said color plane to new pixel dimensions. The new numbers of vertical and horizontal pixels depend upon the resolution of the print head to be used for the particular color and the number of steps in the direction of transport of the receiver substrate required to cover the length of the image, as may be in accordance with the methods described in the above-referenced application entitled "Technique for Printing a Color Image."

Image file processing means 150 also includes monochrome image processing and printer control means 404*a*–*c*, each of which operates on a particular one of the three color planes produced by the color plane separation and resampling means 402. Each of the monochrome image processing and printer control means 404*a*–*c* transforms the 8-bit pixel values in the corresponding color plane into a new 10-bit value that is an index into a lookup table which will later be used in the generation of a particular pulse pattern to be sent to a corresponding print head.

Each of the monochrome image processing and printer control means 404*a*–*c* performs a correction for thermal history on the corresponding color plane. Thermal printers are known to produce substantial deviations from intended image densities as a result of imperfect cooling following previously printed patterns. In addition, heat may diffuse laterally within the print head itself, resulting in printed densities that are dependent on the temperatures of neighboring print head elements.

In one embodiment, monochrome image processing and printer control means 404*a*–*c* perform a method of thermal history control in which a numerical model of heat diffusion and a model of the response of the thermal printing medium to a given input of energy are combined to correct for the abovementioned effects. An example method for compensating for the effects of thermal history is described in U.S. patent application Ser. No. 09/934,703, filed on Aug. 22, 2001, entitled "Thermal Response Correction System," with inventors Suhail Saquib and William T. Vetterling, which is assigned to the assignee of the instant application and which, along with all of its incorporated-by-reference patents and patent applications, is hereby incorporated by reference herein in its entirety.

Monochrome image processing and printer control means 404*a*–*c* may also perform a second correction on the corresponding color planes for the lack of uniformity of resistance of the thermal elements within the print head. It is common practice in thermal printing to modulate the on-time of a given pixel to produce different gray levels. When this method is used to print photographic images, nonuniformity of head resistance will lead to streaks in the picture. It is, of course, possible to stipulate a tight tolerance on the resistance variation across the print head at the time of manufacture. However, this increases the cost of the print head, and may reduce its useful life if changes in the resistance of elements occur as a result of use.

Various embodiments of the present invention may therefore measure the resistance profile of the print head and compensate for nonuniformities in printed output. Such a measurement may occur within the photo-printer itself. Alternatively, the resistance profile of the print head may be measured prior to its installation in the photo-printer, and the data stored in an appropriate memory location. In one embodiment, this compensation is performed concurrently with the thermal history control by adjusting the heating time of each resistor to result in the application of the energy determined from the thermal history algorithm.

The result of the foregoing calculation is, for each pixel, a number representing the level of excitation required in order to obtain the appropriate printed density for that pixel. Each of these numbers may be converted to a digital number representing the number of pulses to be applied to the corresponding print head element to best approximate the necessary level of excitation. It will be appreciated by those skilled in the art that within the time allotted for printing each line of the image, there are a limited number of pulse intervals available, and this leads to a constraint on the number of different levels available for printing. If the number of these levels is insufficient, the transition from one tone value to the next may be visible in the image as steps or contours. A method for increasing the apparent number of tone scale values is known in the art as dithering. The dithering method is effective in overcoming tonal steps and contours resulting from a limited selection of tone values.

Examples of the foregoing method are described in greater detail in U.S. patent application Ser. No. 09/817,932, filed Mar. 27, 2001, entitled "Digital Halftoning," having inventors Dan Bybell, Jay Thornton, and Dana Schuh, which is assigned to the assignee of the instant application and which, along with all of its incorporated-by-reference patents and patent applications, is hereby incorporated by reference herein in its entirety. As is known in the art, the dithering described may be accomplished with the use of dithering matrices that are combined with floating point image data to produce the required digital values for each pixel. In one embodiment of the instant invention, the dithering matrices are 4×4 in dimension.

The foregoing steps may be carried out in software running on the server described above. The data thereby generated may, in one embodiment, be sent to the FPGA described above via a memory buffer interface. The FPGA performs the functions of a pattern generator and a clock. The lookup index value whose generation was described above is used, in conjunction with predetermined patterns stored in a lookup table, to generate the actual pulse pattern to be sent to the print head. The pulse pattern for a particular color is then sent to its associated print head at a rate determined by the FPGA clock. The rates at which the pulse patterns for each color plane are sent are such that each monochrome image is the same length when printed. Temporal offsets accounting for the physical separation between print heads are added to the start of the processes of sending the pulse patterns for each color, so that each monochrome image overlies the others as accurately as possible in the final print.

In one embodiment, one function of the pattern generator is the performance of halftone dot location adjustment to improve the perceived quality of printed images. This technique is described in the above-referenced patent application entitled "Digital Halftoning." Consider, for example, two adjacent halftone pixels, each of which contains a halftone dot. The two halftone pixels share a common pixel boundary. The two halftone dots may be located within their respective halftone pixels such that the two halftone dots abut the common pixel boundary. Such halftone dot location adjustment may be performed for some or all of the halftone pixels in the image to be printed. Various embodiments of this technique and the advantages thereof are described in detail in the above-referenced patent application.

Figure 5:
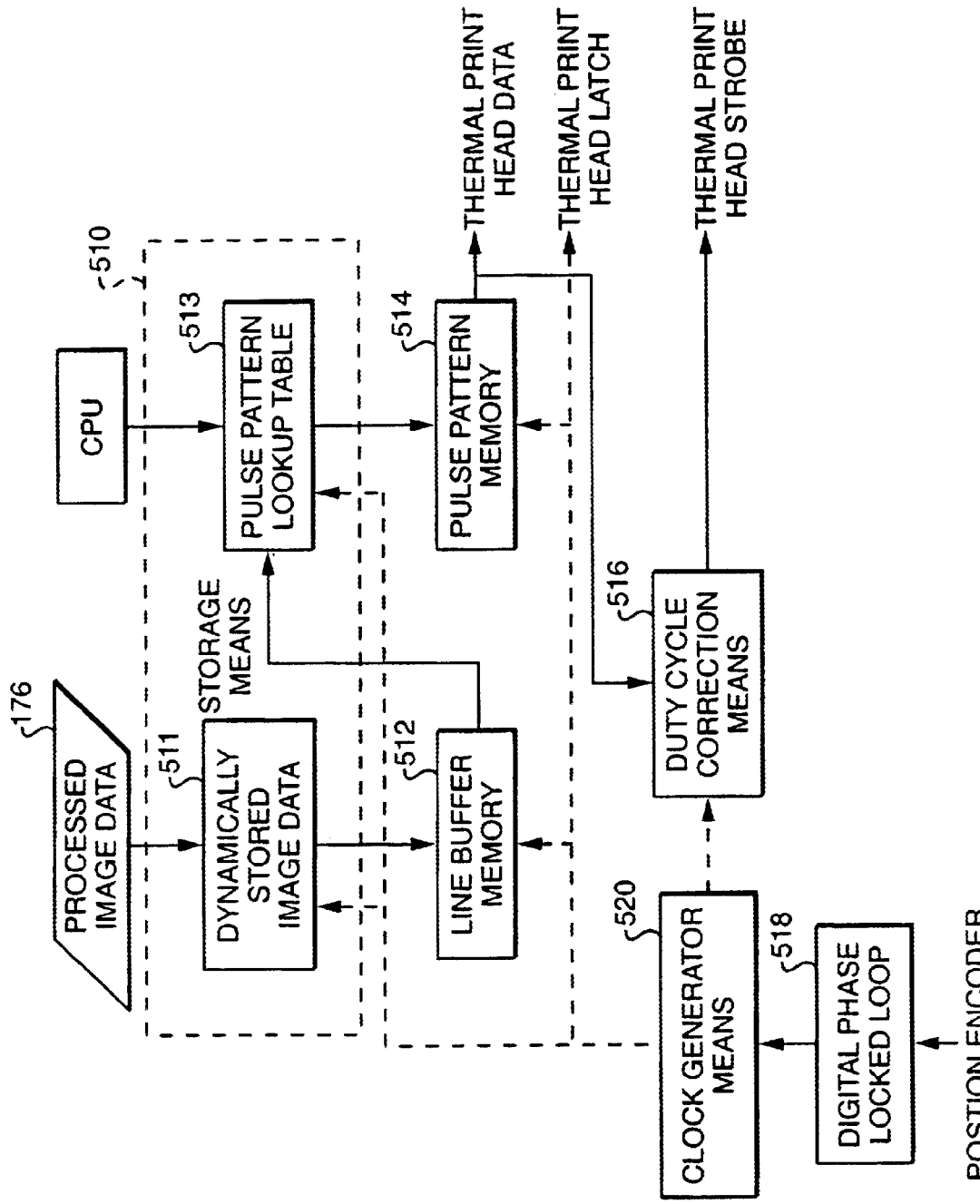
FIG. 5 is a block diagram of an embodiment of the printer controller of one of the thermal print heads in the photo-printing apparatus of FIG. 1A.

FIG. 5 gives more details of the logic for one print head according to one embodiment of the present invention. Storage means 510 serves to store static values such as lookup tables, which are configured upon system initialization. In particular, pulse pattern lookup table 513 is contained within the storage means. In addition, processed image data 176 may be temporarily stored in storage means 510 prior to the generation of the pulse sequences needed to drive the print head, as indicated by dynamically stored image data 511. Dynamically stored image data 511 is first transferred, line-by-line, into line buffer memory 512. The contents of each line are pointers to be used in conjunction with pulse pattern lookup table 513 to produce pulse patterns stored in pulse pattern memory 514. Under the control of clock generator means 520, the stored pulse patterns are serially transferred to the print head. As they are transferred, duty cycle correction means 516 monitors the number of simultaneously active print head elements and adjusts the length of the print head strobe signal accordingly, as described in the above-referenced provisional patent application entitled "Method and Apparatus for Voltage Correction." This corrects for the fact that the voltage across any single resistor depends upon the total number of print head elements being powered during a particular print head cycle. The correction is made by counting the number of resistors being energized, and using this value to modify the time of heating, generally increasing the heating time as more pixels are energized. Reference number 518 of FIG. 5 refers to a digital phase-locked loop (PLL), which may be used to synchronize the printing operation with the motion of the web of media passing through the printer. This synchronization may be accomplished via a rotary encoder coupled to a component of the web transport, for example a printer platen or a motor advancing the web. In an alternative embodiment, an internal oscillator with a feedback loop may be used to perform the same function as the digital PLL. Synchronization signals from the digital PLL, or alternatively signals from the internal oscillator, are provided to clock generator means 520, which derives the clock signals necessary to transfer dynamically stored data 511 between the storage means 510 and line buffer memory 512, convert line buffer memory data to pulse pattern data stored in the pulse pattern memory 514, shift the pulse patterns in a serial fashion into the print head, and apply the print head data loading and strobe signals required for printing, as is known to those skilled in the art. Distributed clock signals are indicated by dashed lines in FIG. 5.

Figure 6:
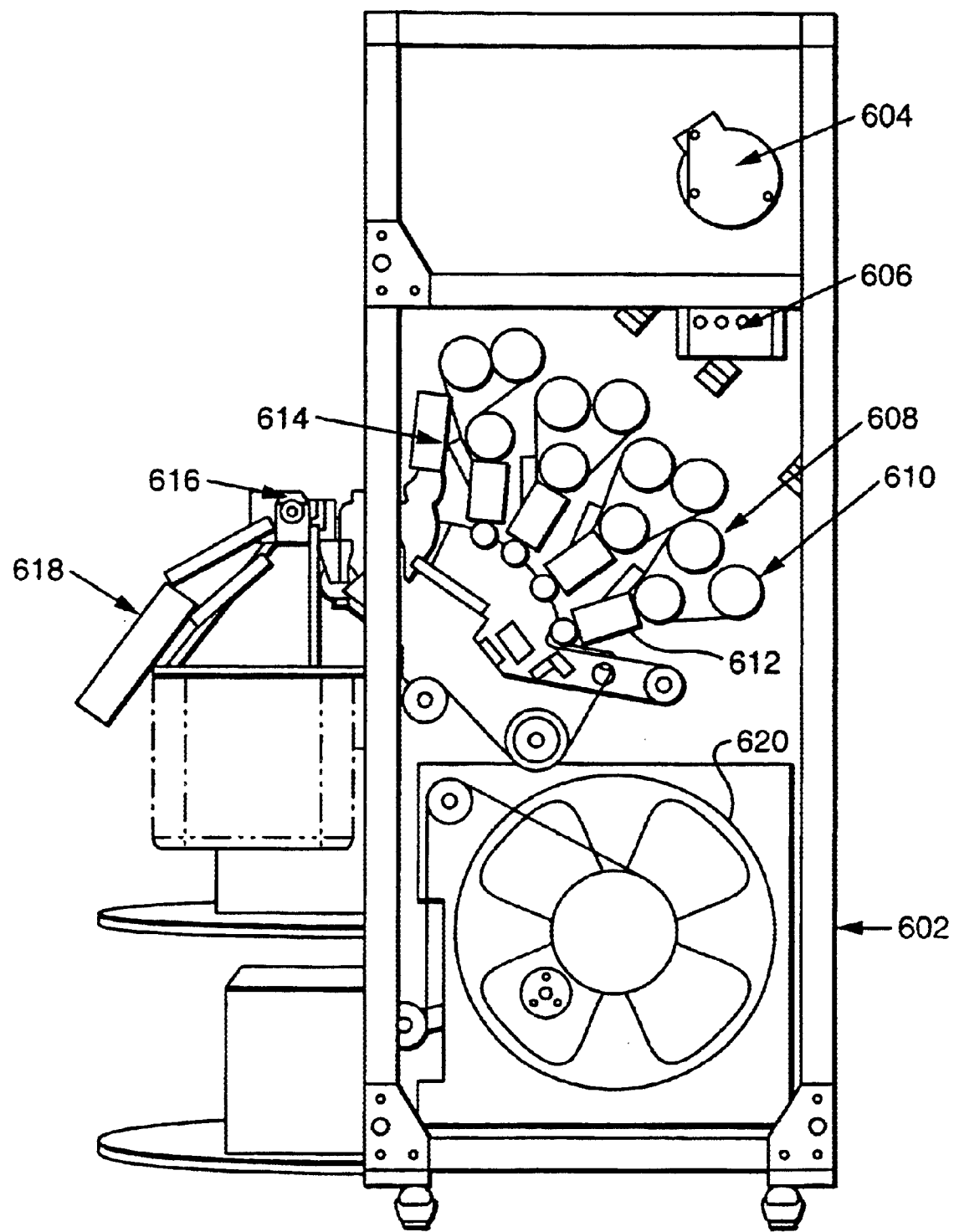
FIG. 6 is a perspective side elevational view of an integrated photo-printing apparatus according to one embodiment of the present invention.

FIG. 6 illustrates a mechanical configuration of one embodiment of the instant invention. Enclosure 602 provides a protected environment in which photo-printing may be carried out. Ventilation fan 604 provides cooling for the processors, power supplies, motors, and print head assemblies contained in the enclosure 602, while filter 606 (which may, for example, be a high efficiency particulate arresting (HEPA) filter) filters the air to remove particulates capable of causing defects in the output prints. Within the printing chamber are four print head assemblies. The first three print head assemblies, illustrated by print head assembly 612, print the three subtractive primary colors cyan, magenta and yellow in a predetermined order. Each of these print heads is associated with two spools. For print head assembly 612 the spools are indicated by 608 and 610. Spool 610 carries a supply of monochrome donor material of one of the three colors. Spool 608 is a take-up spool that winds up the used donor sheet after it has passed under the print head. The fourth print head assembly 614 applies an overcoat to the finished print just before it enters a cutter 616 that separates the images. Following separation, the images are deposited in an exit tray 618 for access by the user. Beneath the print head assemblies is a compartment containing a spool of receiver material 620.

It is to be understood that although the invention has been described above in terms of particular embodiments, the foregoing embodiments are provided as illustrative only, and do not limit or define the scope of the invention. Various other embodiments, including but not limited to the following, are also within the scope of the claims.

Elements and components described herein may be further divided into additional components or joined together to form fewer components for performing the same functions.

The techniques described above may be implemented, for example, in hardware, software, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Printers suitable for use with various embodiments of the present invention typically include a print engine and a printer controller. The printer controller receives print data from a host computer and generates page information. The printer controller transmits the page information to the print engine to be printed. The print engine performs the physical printing of the image specified by the page information on an output medium.

What is claimed is:

1. A thermal printer comprising:
   a plurality of thermal print heads, each of the plurality of thermal print heads being operable to print a distinct one of a plurality of colors; and
   dot size varying means for varying perceived levels of color printed by the thermal printer by varying sizes of dots printed by the plurality of thermal print heads,
   wherein a first one of the plurality of thermal print heads has a first number of thermal elements that is energizable at a first rate, wherein a second one of the plurality of thermal print heads has a second number of thermal elements that is energizable at a second rate, the first number being different than the second number, the first rate being different from the second rate.

2. The thermal printer of claim 1, wherein the plurality of colors comprises cyan, magenta, and yellow.

3. The thermal printer of claim 2, wherein the plurality of colors further comprises black.

4. The thermal printer of claim 1, further comprising:
   means for performing tone scale adjustment on an image to be printed;
   means for performing thermal history correction on the image to be printed;
   means for performing resistance profile correction on the image to be printed;
   means for performing dithering on the image to be printed;
   means for performing halftone dot location adjustment on the image to be printed; and
   means for performing common mode voltage correction on the image to be printed.

5. A thermal printer comprising:
   a plurality of thermal print heads, each of the plurality of thermal print heads being operable to print a distinct one of a plurality of colors, said plurality of thermal print heads being used to perform a thermal mass transfer method of printing selected from the group consisting of: (1) thermal mass transfer of a dye or pigment containing wax or resin, and (2) thermal mass transfer of an amorphous dye in combination with a thermal solvent,
   dot size varying means for varying perceived levels of color printed by the thermal printer by varying sizes of dots printed by the plurality of thermal print heads; and
   wherein a first one of the plurality of thermal print heads has a first number of thermal elements that is energizable at a first rate, wherein a second one of the plurality of thermal print heads has a second number of thermal elements that is energizable at a second rate, the first number being different than the second number, the first rate being different from the second rate.

6. The thermal printer of claim 5, wherein the plurality of colors comprises cyan, magenta, and yellow.

7. The thermal printer of claim 6, wherein the plurality of colors further comprises black.

8. The thermal printer of claim 5, further comprising:
   means for performing tone scale adjustment on an image to be printed;
   means for performing thermal history correction on the image to be printed;
   means for performing resistance profile correction on the image to be printed;
   means for performing dithering on the image to be printed;
   means for performing halftone dot location adjustment on the image to be printed; and
   means for performing common mode voltage correction on the image to be printed.

9. A thermal printer comprising:
   a plurality of thermal print heads;
   means for performing tone scale adjustment on an image to be printed;
   means for performing thermal history correction on the image to be printed;
   means for performing resistance profile correction on the image to be printed;
   means for performing dithering on the image to be printed;
   means for performing halftone dot location adjustment on the image to be printed; and
   means for performing common mode voltage correction on the image to be printed.

10. The thermal printer of claim 9, wherein the means for performing tone scale adjustment, the means for performing thermal history correction, the means for performing resistance profile correction, the means for performing dithering, the means for performing halftone dot location adjustment, and the means for performing common mode voltage correction are arranged to perform their respective functions in the order recited in claim 9.

11. A method for use in a thermal printer having a plurality of thermal print heads, each of the plurality of thermal print heads being operable to print a distinct one of a plurality of colors, the method comprising a step of:
   (A) varying perceived levels of color printed by the thermal printer by varying sizes of dots printed by the plurality of thermal print heads,
   wherein a first one of the plurality of thermal print heads has a first number of thermal elements, wherein a second one of the plurality of thermal print heads has a second number of thermal elements, the first number being different than the second number:
   (B) energizing the first one of the plurality of print heads at a first rate; and
   (C) energizing the second one of the plurality of print heads at a second rate, wherein the first rate differs from the second rate.

12. The method of claim 11, further comprising steps of:
   (D) performing tone scale adjustment on an image to be printed;
   (E) performing thermal history correction on the image to be printed;

(F) performing resistance profile correction on the image to be printed;

(G) performing dithering on the image to be printed;

(H) performing halftone dot location adjustment on the image to be printed; and (I) performing common mode voltage correction on the image to be printed.

13. A method for use in a thermal printer, the thermal printer including a plurality of thermal print heads, each of the plurality of thermal print heads being operable to print a distinct one of a plurality of colors, the method comprising the steps of:

(A) printing using a thermal mass transfer method of printing selected from the group consisting of: (1) thermal mass transfer of a dye or pigment containing wax or resin, and (2) thermal mass transfer of an amorphous dye in combination with a thermal solvent, (B) varying perceived levels of color printed by the thermal printer by varying sizes of dots printed by the plurality of thermal print heads, wherein a first one of the plurality of thermal print heads has a first number of thermal elements, wherein a second one of the plurality of thermal print heads has a second number of thermal elements, the first number being different than the second number (C) energizing the first one of the plurality of print heads at a first rate; and (D) energizing the second one of the plurality of print heads at a second rate, wherein the first rate differs from the second rate.

14. The method of claim 13, further comprising steps of:

(E) performing tone scale adjustment on an image to be printed;

(F) performing thermal history correction on the image to be printed;

(G) performing resistance profile correction on the image to be printed;

(H) performing dithering on the image to be printed;

(I) performing halftone dot location adjustment on the image to be printed; and (J) performing common mode voltage correction on the image to be printed.

15. A method for use in a thermal printer, the thermal printer including a plurality of thermal print heads, the method comprising steps of:

(A) performing tone scale adjustment on an image to be printed;

(B) performing thermal history correction on the image to be printed;

(C) performing resistance profile correction on the image to be printed;

(D) performing dithering on the image to be printed;

(E) performing halftone dot location adjustment on the image to be printed; and (F) performing common mode voltage correction on the image to be printed.

16. The method of claim 15, wherein the steps (A)–(F) are performed in the order recited.

* * * * *